Aug. 5, 1952  M. P. WINTHER ET AL  2,605,650
POWER TRANSMISSION
Filed Nov. 7, 1949  4 Sheets-Sheet 1

Martin P. Winther
Howard J. Findley
Inventors.
Haynes and Koenig
Attorneys.

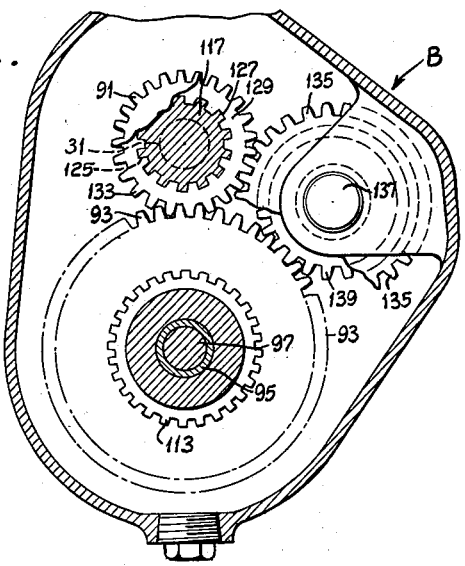
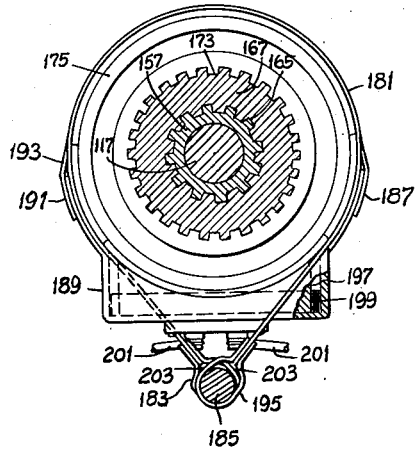
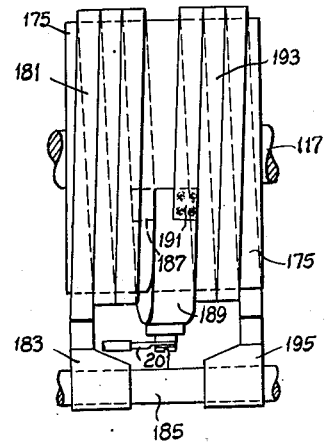

Aug. 5, 1952   M. P. WINTHER ET AL   2,605,650
POWER TRANSMISSION
Filed Nov. 7, 1949   4 Sheets-Sheet 3
FIG. 5.   FIRST GEAR
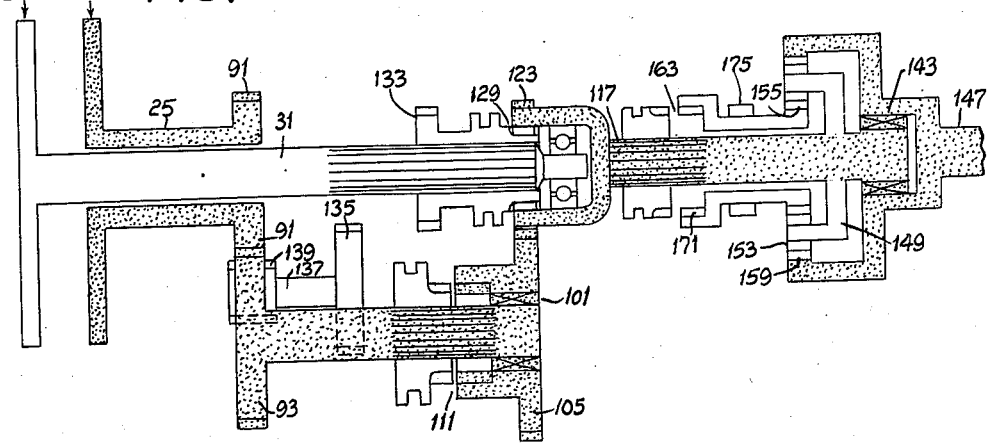
FIG. 6.   SECOND GEAR
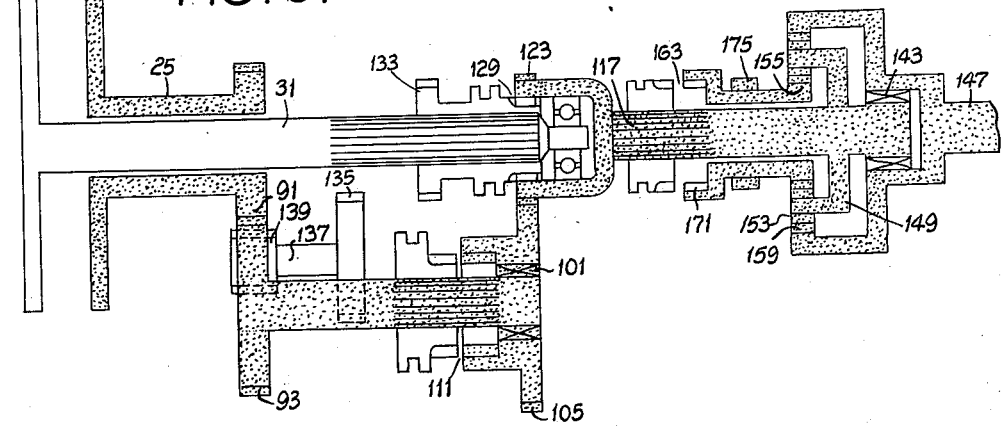
FIG. 7.   THIRD GEAR
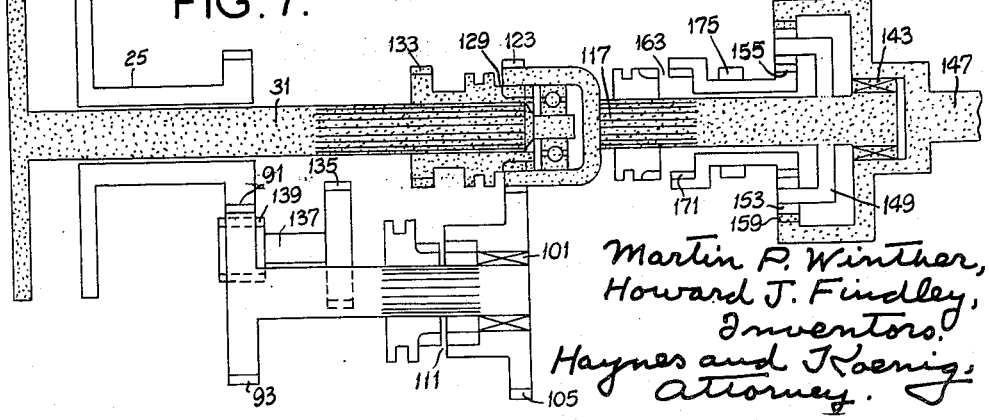
Martin P. Winther,
Howard J. Findley,
Inventors.
Haynes and Koenig,
Attorneys.

Aug. 5, 1952   M. P. WINTHER ET AL   2,605,650
POWER TRANSMISSION
Filed Nov. 7, 1949   4 Sheets-Sheet 4
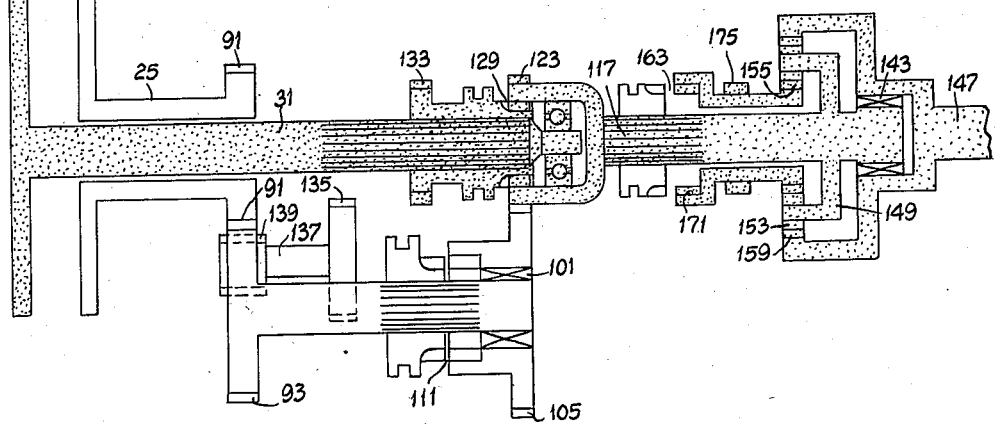
FIG. 8. FOURTH GEAR
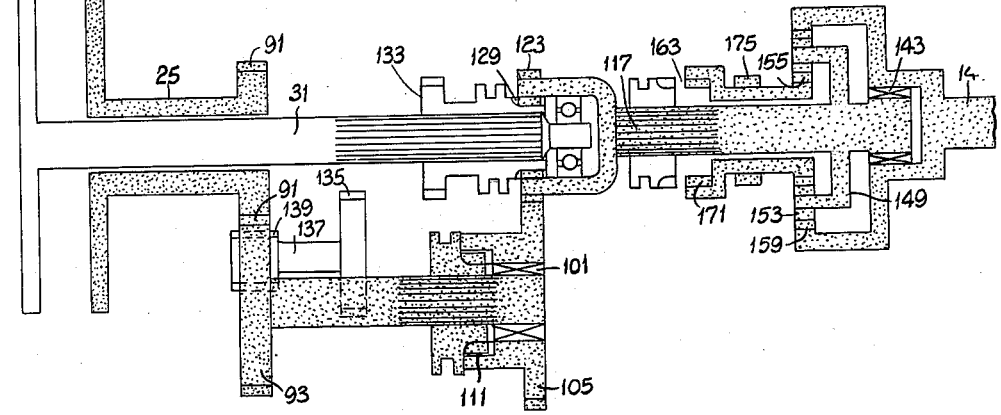
FIG. 9. HILL GEAR
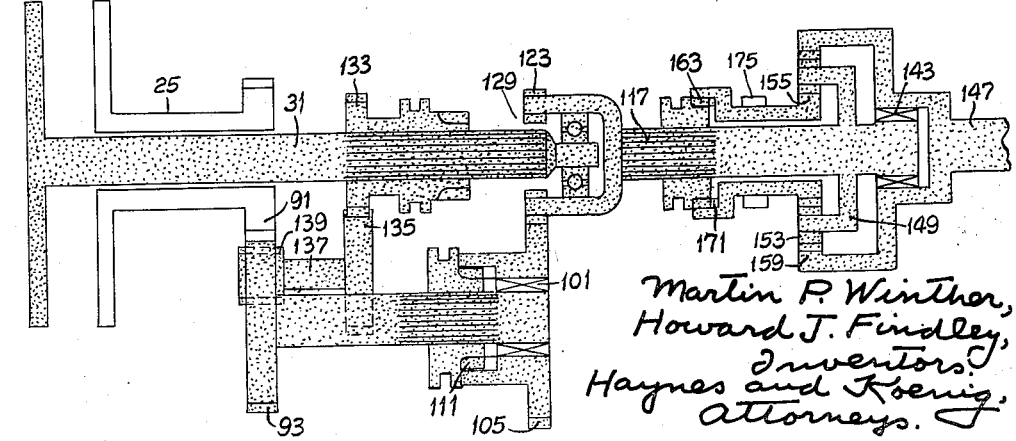
FIG. 10. REVERSE GEAR
Martin P. Winther,
Howard J. Findley,
Inventors.
Haynes and Koenig,
Attorneys.

Patented Aug. 5, 1952

2,605,650

UNITED STATES PATENT OFFICE 2,605,650

POWER TRANSMISSION

Martin P. Winther, Gates Mills, and Howard J. Findley, Lyndhurst, Ohio; said Winther assignor to Martin P. Winther, as trustee, and said Findley assignor to Eaton Manufacturing Company, Cleveland, Ohio, a corporation of Ohio Application November 7, 1949, Serial No. 125,854

2 Claims. (Cl. 74—740)

This invention relates to power transmissions, and more particularly to a selective torque-converting transmission primarily for automotive use.

Among the several objects of the invention may be noted the provision of a light-weight, low-cost, reliable automotive transmission which will provide a sequence of torque conversions for progressively effecting four forward driving gear ratios plus a selectively operable braking gear for hill use, and a reverse gear; the provision of a transmission of the class described which for the number of change-gear operations available minimizes the number and complexity of gear trains, clutches, brakes, dental couplings and the like required, and which employs no hydraulic couplings, valves or the like; and the provision of a simply controlled transmission of this class in which the number of controls to be coordinated is minimized so that it may be readily coordinated with such automatic operations as may be desired.

Another object is to produce a transmission which by means of a simple electrical control, without the necessity of meshing and unmeshing gears, will permit a vehicle to be rocked back and forth when mired, or the like. Other objects will be in part apparent and in part pointed out hereinafter.

Briefly, the invention consists in first and second alternatively operable friction clutches, with means whereby when the first clutch is closed it is adapted, by selective connections through a fixed-center gear train, to a simple planetary gear train for first, second and hill gear operations; also when the second clutch is closed, it is directly connected (without the fixed-gear train) to said planetary train for third and fourth gear operations, said second clutch being connected to said planetary gear train through the first train for reverse gear operation. Only the setting of a brake in connection with the planetary gear train is required to introduce a simple overdrive effect by the planetary train to convert from first gear to second gear operation; and a resetting of this same brake to convert from third gear operation to fourth gear (or final overdrive) operation.

The planetary train includes a simple overrunning clutch and a locking brake for its sun gear, and the first gear train is provided with simple over-running and dental couplings, whereby selective connections may easily be made in both the planetary and fixed-center trains to select first, second or hill gear operations when the first clutch is closed. Simple mechanical couplings are arranged in connection with the second clutch whereby third, fourth and reverse gear operations may be selected.

At the outset it is to be understood that operation of the transmission may be regulated from any suitable control system, and that the invention is not limited to any particular one of such systems, except as to the sequence of control operations required as disclosed herein. Whereas the invention is independent of any particular structure that may be employed to carry out the disclosed control sequence, and whereas in fact said sequence may be carried out manually, the invention is described in connection with the sequence of operations required, but independently of any controls (automatic or manual) that might be used, whether those be new or old.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a longitudinal section through a practical embodiment of the invention;

Fig. 2 is a cross section taken on line 2—2 of Fig. 1, showing certain reverse gear connections;

Fig. 3 is a cross section taken on line 3—3 of Fig. 1, showing an end elevation of a locking magnetic band brake;

Fig. 4 is a side elevation of the operating parts of said band brake removed from other parts; and, Figs. 5—10 are power flow diagrams, based upon simplified schematic illustrations of the parts shown in Fig. 1, wherein Fig. 5 shows connections for first gear, Fig. 6 for second gear, Fig. 7 for third gear, Fig. 8 for fourth gear, Fig. 9 for hill gear and Fig. 10 for reverse gear.

Similar reference characters indicate corresponding parts throughout the several views of the drawings.

General assembly

Figure 1:
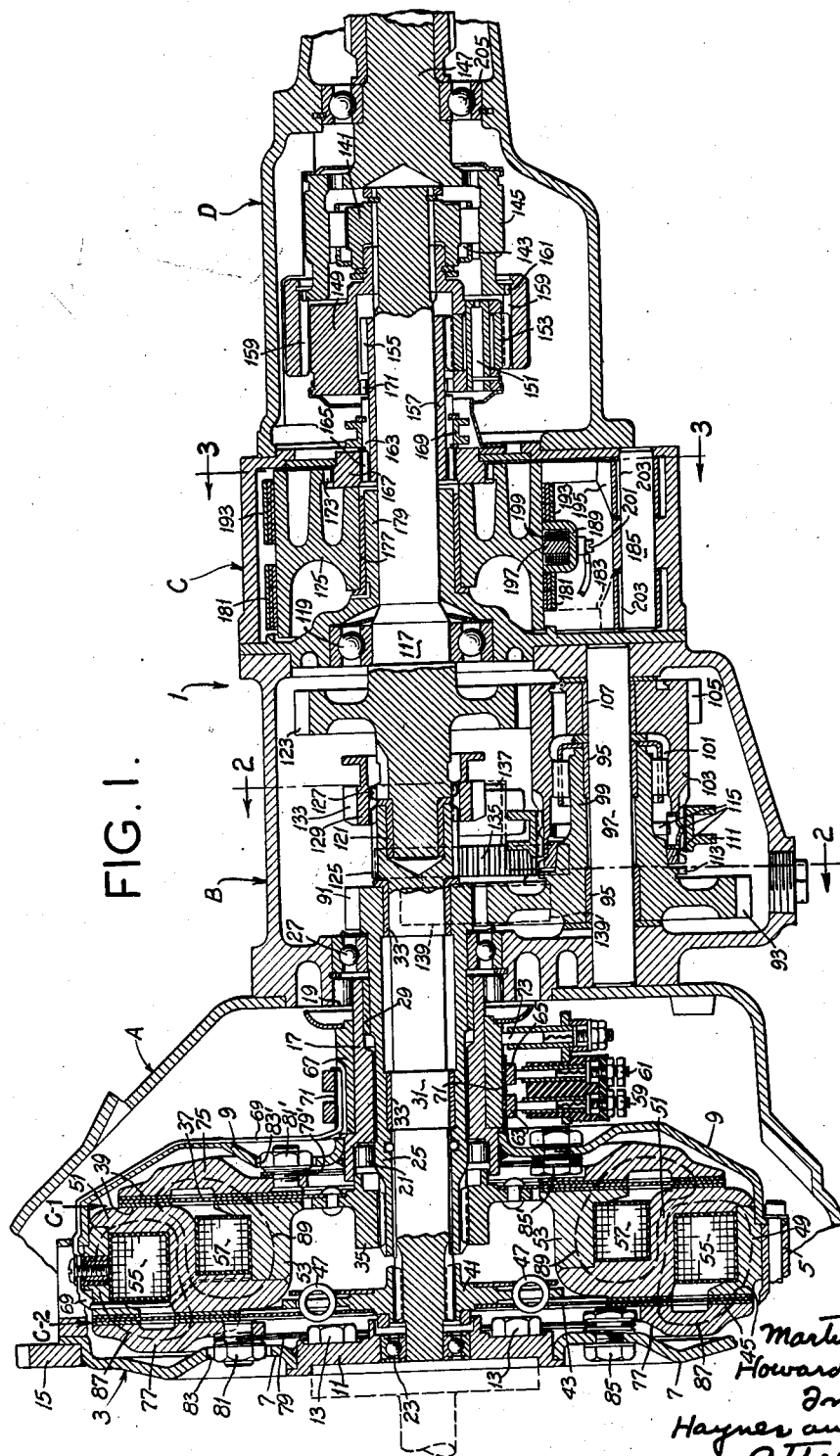

Referring now more particularly to Fig. 1, there is shown at numeral 1 a complete case which is composed of several parts forming a clutch case A, a case B for a fixed-center gear train, a case C for a magnetic locking brake, and a case D for a planetary train. The case assembly 1 is adapted to be bolted at its forward end to the power plant which the transmission serves, such as, for example, an automotive engine of a road vehicle.

Clutch assembly

Within the left clutch housing A is a rotary clutch housing designated in general by the numeral 3. This clutch housing is made up of an outer ring 5 having an enclosing front plate 7 and an enclosing rear plate 9. The front plate 7 carries a central hub 11 for attachment to the usual flange carried upon the crankshaft of the driving engine, the fastenings for this purpose being indicated at 13. The hub 11 carries a central pilot ball bearing 23. On the periphery of the plate 7 is carried the usual starter ring gear 15 for cranking the engine. Extending from the rear plate 9 is a supporting sleeve 17, supported upon roller bearings 19 and 21, the sleeve being rotary with the clutch housing 3. The bearing 19 is carried in the frame 1. The bearing 21 is carried upon the outside of a clutch quill 25, the latter being supported at the rear in a ball bearing 27 carried in the housing 1. The quill 25 is maintained coaxial with sleeve 17 by the bearing 21. An additional sleeve bearing 29 serves to maintain this alignment. Within the quill 25 is a clutch shaft 31, supported in the pilot ball bearing 23 and within two sleeve bearings 33 within the quill 25.

At its left end the clutch quill 25 is splined to the hub 35 of a first driven clutch plate 37, having the usual clutch facings 39 where required. The left end of the clutch shaft 31 is splined to the hub 41 of a second clutch plate 43, which has the usual clutch facings 45 where required. The connection between the clutch plate 43 and hub 41 is made by way of conventional vibration damper springs 47, requiring no further description except to mention that similar dampers are not necessary in connection with clutch plate 37. This is because clutch plate 37 is, as will appear, operative only under low gear conditions, wherein such dampers are not as necessary as the higher gear conditions under which clutch plate 43 operates. In some cases the damper springs 47 are unnecessary.

Attached within and rotary with ring 5 is a magnetic (ferrous) ring 49. Welded to ring 49 is a second magnetic ring 51 which is generally S-shaped in cross section. Welded within the ring 51 is a third magnetic ring 53. Rings 49, 51 and 53 rotate as a unit with the clutch housing 3 and form recesses for annular magnetic field coils 55 and 57. These coils 55 and 57 are individually excited by current introduced through brushes 59 and 61, serving the coils through collector rings 63 and 65. These collector rings 63 and 65 are mounted upon a conducting sleeve 67, being separated therefrom by an insulating sleeve 71. Sleeve 67 is carried on sleeve 17. Suitable wiring, part of which is shown at 69, connects the collector rings 63 and 65 with the coils 55 and 57, respectively, both coils being grounded to the sleeve 67 which is provided with a grounding brush 73. Suitable external circuits are provided through brushes 59, 61 and 73 for selective excitation of the coils 55 and 57.

To the right of plate 37 is a first magnetic pressure or clapper ring 75 and to the left of the clutch plate 43 is a second magnetic pressure or clapper ring 77. Three fasteners 81 at equally spaced intervals connect a laminated assembly 79 of several thin sheet steel rings to the magnetic ring 77. Openings 83 in the plate 7 permit axial movements of the bolts 81, as required by any axial movements of the ring 77. It is to be understood that the cross section of Fig. 1 shows only one of the equally spaced bolts 81 and openings 83, the others being out of the sectional plane. Similarly, three equally spaced fasteners 81', movable in clearance openings 83' in plate 9, attach a laminated assembly 79' of several thin sheet steel rings to the magnetic ring 75. Also, the laminated ring 79' is supported at three equally spaced intervals upon the plate 9 by means of fasteners 85'. In the section, only one of these supports appears. Likewise, the laminated ring 79 is supported upon plate 7 at three equally spaced intervals by fasteners 85, one of which shows. From the above it will be seen that each magnetic pressure ring 77 and 75 is attached to and supported from the clutch housing 3 by means of the flexible connection (laminated steel ring structures 79 or 79'). The laminated rings 79 and 79', being flexible in the axial direction, allow axial floating movements of the magnetic rings 77 and 75, but prevent relative rotary movements between these rings 77 and 75 and the clutch housing 3.

Thus if the inner coil 57 is excited to produce a toroidal flux field, a section of which is shown at 89 and which interlinks rings 75, 51 and 53, the ring 75 is attracted magnetically to act as a pressure plate or clapper to squeeze the clutch disc 37 against the faces of rings 51 and 53, thus effecting a closure of what will hereinafter be referred to as a first clutch C-1. If the outer coil 55 is excited to produce a toroidal flux field, a section of which is shown at 87 and which interlinks rings 77, 49 and 51, the ring 77 is attracted to act as a pressure plate or clapper to squeeze the clutch disc 43 against the faces of rings 49 and 51, thus effecting a closure of what will hereinafter be referred to as the second clutch C-2. When the clutches C-1 and C-2 are closed, the laminated spring rings 79 and 79' supporting the pressure rings 75 and 77, respectively, are axially sprung. When the coils 55 and 57 are deenergized, these rings return to their initial unsprung positions, thereby retracting to withdraw the rings 75 and 77, thus opening the clutches C-1 and C-2.

In view of the above, it will be seen that when coils 55 and 57 are unexcited, rotation of the clutch housing 3 may occur freely without affecting quill 25 or shaft 31. When coil 57 is excited, the magnetic ring 75 is drawn to the left to close clutch C-1, thus to drive the quill 25. When the coil 55 is excited, the magnetic ring 77 is drawn to the right to close clutch C-2, thus to drive the shaft 31.

Fixed-center gear train

The quill 25 reaches into the gear box B, where it is provided with a pinion 91, meshed with a gear 93 which is rotary upon sleeve bearings 95, the latter being supported upon a countershaft 97. Gear 93 includes an extension 99 forming the inner race of an overrunning clutch 101. The outer race of this clutch is carried within an extension 103 of a pinion 105, carried upon a sleeve bearing 107 supported upon the same countershaft 97. The overrunning clutch 101 is arranged such that when the flow of power tends to be from gear 93 to gear 105, the extensions 99 and 103 become coupled for 1:1 rotation between said gears. When the flow of power tends to be from gear 105 toward gear 93, the overrunning clutch 101 automatically releases or opens to allow overrun of gear 105 with respect to gear 93. Further details of overrunning clutches are unnecessary, various forms being known but the clutches of this type shown herein are of the roller type, as illustrated.

The outside of the extension 103 is interiorly splined to the inside of a movable dental coupling ring 111. The ring 111 is grooved to accept a conventional shifter fork (not shown). The gear 93 carries additional teeth 113 with which the inner splines of the coupling ring 111 may be engaged by shifting the latter to the left. This locks together the gears 93 and 105, immobilizing the overrunning clutch 101. Within and adjacent to the coupling ring 111 is shown an assembly of synchronizing parts 115 which will not be further described since their use is common in connection with dental couplings to minimize tooth clash. Moreover, any other suitable synchronizer may be used at this point and the action of the invention is not dependent upon its exact form. The essential feature at this point is the openable direct-drive coupling construction connecting gears 93 and 105 which, when open, allows operation of the overrunning clutch 101 and when closed immobilizes it.

At 117 is shown an intermediate shaft supported within a bearing 119 in the frame 1. The left end of the shaft extends into the gear box B, where it is piloted in the right end of shaft 31 by means of a sleeve bearing 121. This shaft 117 carries a gear 123 meshing with the gear 105. The right-hand end of shaft 31 carries splines 125 and the left-hand end of shaft 117 carries splines 127. An internally splined ring 129 is movable from a position to engage both sets of splines 125 and 127 to provide a 1:1 dental coupling between shafts 131 and 117; or to a left-hand position disengaging splines 127 to open this coupling. Thus this ring 129 forms a dental coupling. Ring 129 is grooved, as shown, to accept a conventional shifter fork.

Ring 129 is also formed as a pinion 133, engageable with a gear 135 of a reversing cluster supported upon a stud 137 attached to the inside of box B. The other gear 139 of the cluster permanently meshes with gear 93. When the ring 129 is moved to the left to de-couple shafts 31 and 117, it meshes with gear 135. When it moves to the right for coupling these shafts, it unmeshes from gear 135.

*Planetary gear train*

Shaft 117 extends through the locking brake housing C (described below) and into the planetary gear housing D. At its right-hand end shaft 117 is splined to the inner race 141 of another overrunning roller clutch 143. The outer race 145 of the clutch is an integral part of the driven output shaft 147 of the transmission, which is supported in a bearing 205. When power flow tends to be from the race 141 to race 145, the clutch 143 automatically locks, so that shaft 117 may drive shaft 147. When the tendency is for reverse direction of power flow, the clutch 143 opens so that shaft 147 may overrun shaft 117. Shaft 117 is also splined to a planet carrier 149 which supports three equally spaced studs 151, one of which is shown in the cross section. Supported upon needle bearings on the studs are planet gears 153. Interiorly, these mesh with a sun gear 155 on a coupling quill 157. Externally, planet gears 153 mesh with the inside of an annular ring gear 159. The internal teeth of this annular gear 159 also form a splined connection with splines 161 on the outer race 145 forming part of the shaft 147. The quill 157 also carries splines 163, the left ends of which engage with internal splines 165 of a drive ring 167. The right ends of these splines 163 are engageable with internal splines 171 of the planet carrier 149, thus forming a dental coupling. Engagement of the dental coupling may be effected without disengaging the left ends of the splines from the splines 165, the entire quill 157 being shifted for the purpose. When the quill is shifted, the sun gear 155 will remain in sufficient driving mesh with the planet gears 153. Attached to the quill 157 around the splines 163 is a member 169, forming a circular groove for accepting a suitable shifter fork.

*Locking brake*

The drive ring 167 has a splined permanent connection 173 with a brake drum 175 in the brake housing C. Drum 175 is supported on a pilot sleeve bearing 177 on a fixed sleeve 179 extending from the housing 1, the shaft 117 passing through this sleeve 179.

A magnetic brake is provided for the brake drum 175, the character of which will be clear from Figs. 3 and 4. It is constituted by a lined coiled brake band 181 which is anchored at 183 to an anchor pin 185 carried in the box C. The other end 187 of the band 181 is attached to one side of an arcuately formed magnetic box 189. The other side of the box is attached at 191 to a second lined coiled brake band 193. The direction of coil of the two helices 181 and 193 is the same. The end of the band 193 not attached to the box 189 is anchored at 195 to said pin 185. Inside the box 189 is a magnetic pole 197 which, like the walls of the box, arcuately fits the surface of the drum 175. Around this pole 197 is wound an electric coil 199 which may be energized through leads 201. There is insufficient initial friction between the bands 181 and 193 on the one hand, and the surface of drum 175 on the other hand, to initiate any servo braking action when the coil 199 is unexcited. When the coil 199 is excited, the resulting flux field causes the box 189 (including the pole 197) to cling to the surface of drum 175, which initiates wrapping action upon one or the other of the coils 181 or 193, depending upon the direction of rotation of the drum. This initial action is followed by a frictional servo action from the respective coil to lock the drum 175 against rotation. It will be seen that when the magnet causes tight wrapping of one coil such as 181, the tendency is to loosen the other coil 193, and vice versa, depending upon the direction of rotation of the drum 175 immediately preceding braking. Play, such as indicated at 203 in connection with the anchors 183 and 195, permits this action. The purpose of the electromagnetic servo brake above described is instantly to lock the drum 175 against rotation whenever the coil 199 is energized. This locks the sun gear 155 of the planetary gear train in box D.

*Operating conditions*

Below is an operating table indicating the conditions of various items, namely, of the magnetic friction clutches in housing A, dental couplings, and overrunning clutches in fixed-center gear housing B, dental couplings and overrunning clutches in planetary gear housing D, and magnetic brake in brake housing C. As already made clear, these settings may be determined by external sequence control means responsive to any desired independent variables such as manual operations, car speed, engine speed, throttle condition, or the like; or they may be responsive entirely to manual operation. The table may be consulted in connection with the descriptions of operations given immediately below.

torque, thus providing second gear operation. It will be seen that second gear operation thus amounts to using the same fixed-center gear box B for the drive and employing the planetary gear box D as a planetary overdrive.

*Operating table*

| Item | Operation | | | | | | |
|---|---|---|---|---|---|---|---|
| | First Gear | Second Gear | Third Gear | Fourth Gear | Hill Gear | Reverse Gear | Rocking Action |
| Clutch C-1 | Closed | Closed | Open | Open | Closed | Open | Closed. |
| Clutch C-2 | Open | Open | Closed | Closed | Open | Closed | Open. |
| Dental Coupling 129 | Closed | Closed | do | do | Closed | Opened | Opened. |
| Dental Coupling 111 | Opened | Opened | Opened | Opened | do | Closed | Closed. |
| Overrunning Clutch 101 | Locks | Locks | Releases | Releases | Immobilized | Immobilized | Immobilized. |
| Dental Coupling 163 | Opened | Opened | Opened | Opened | Opened | Closed | Closed. |
| Overrunning Clutch 143 | Locks | Releases | Locks | Releases | Releases | Immobilized | Immobilized. |
| Brake Drum 175 | Released | Locked | Released | Locked | Locked | Released | Released. |
| Gears 133 and 135 | Unmeshed | Unmeshed | Unmeshed | Unmeshed | Unmeshed | Meshed | Meshed. |

In connection with schematic Figs. 5–10, which show operating conditions, it should be understood that they are entirely diagrammatic. For practical ratios of gear pitch diameters, clutch diameters, brake diameters, etc., Fig. 1 controls. The primary purpose of Figs. 5–10 is to indicate power flow under various conditions of parts indicated in the above table. The power flow is indicated by stippling.

*First gear operation (Fig. 5)*

Assume the clutch housing 3 to be driven from the engine and rotating. Clutch C-1 is then closed by exciting coil 57, coil 55 being unexcited and clutch C-2 open. This rotates quill 25 and gears 91 and 93. Since coupling 111 is open, the tendency for gear 93 to overrun gear 105 will cause clutch 101 to lock, thus driving gear 105. Gear 105 drives gear 123, and coupling 129 may be closed as shown. This rotates shaft 117. Clutch C-2 is deenergized and open, permitting shaft 31 to follow shaft 117, coupling 129 being closed. Since the dental coupling 163 is at this time open and the brake 175 is released, there is no point of reaction to the frame for the planetary gears 153. Hence shaft 117 tends to overrun driven shaft 147 but cannot do so because overrunning clutch 143 locks. Thus in first gear drive, speed is reduced and torque stepped up only by operation through the fixed-center gear train in the box B, the pitch diameters of these gears being such as to provide the desired first gear ratio.

*Second gear operation (Fig. 6)*

It will be noted from the operating table that the only outside-controlled operation required to convert from first gear operation to second gear operation is to lock the brake 175, which involves only energizing coil 199. Then the power flow is the same as it was in first gear operation from clutch C-1 through gears 91, 93, 105, 123 to shaft 117. However, since the brake 175 has been locked, the sun gear 155 becomes stationary and provides a reaction point relative to the frame for the planetary gears 153. These are driven by the planet carrier 149 connected to shaft 117 and, in rolling around the now fixed sun gear 155, force the annular ring gear 159 ahead at a higher angular velocity than the shaft 117. The overrunning clutch 143 then releases automatically and the driven shaft 147, which is connected with the annular gear 159, is driven at an increased speed (relative to first gear speed) and at lower

*Third gear operation (Fig. 7)*

As shown in the table, clutch C-1 is opened and clutch C-2 closed, which transfers the engine drive from the quill 25 to the shaft 31. Since dental coupling 129 is still closed, shaft 117 is directly power-driven from shaft 31. Since the brake 175 is now placed in the same released condition that it was under first gear operation, the sun gear 155 again provides no reaction against the frame and the overrunning clutch 143 again automatically locks and provides a direct coupling between shafts 117 and 147. The result is that there is a direct connection between the engine and the shaft 147, neither the first gear train box B nor the overdriving planetary gear box D being effective to change torque. Thus third gear operation is a direct drive between the engine and shaft 147.

*Fourth gear operation (Fig. 8)*

Fourth gear operation is intended to provide an overdrive under normal cruising speeds of the automobile served by the transmission. To bring fourth gear operation into play, it is necessary only to lock the brake 175 (energize coil 199). This requires only the same kind of simple external control as was required to produce second gear drive from first gear drive. The power flow is the same as that in third gear, except that since the sun gear 155 becomes locked and provides a reaction to the frame for the planetary gears 153, the planetary gear functions as an overdrive, the overrunning clutch 143 automatically releasing. Hence in fourth gear operation the speed of shaft 147 increases and torque decreases.

*Hill gear operation (Fig. 9)*

It is not desirable in a transmission of this class to limit the operator to downhill operation in speeds such as third gear or fourth gear, because of the small mechanical advantage of the engine in respect to the road wheels under such inverse drive conditions. Nor is first gear satisfactory, for although the mechanical advantage of the engine acting as a brake is sufficient, the downhill car speed is too slow. The mechanical advantage afforded in second gear is about correct, giving sufficient torque advantage to the engine for effective braking control and sufficient car speed for convenience. However, second gear cannot be used for the purpose with the dental coupling 111 in the open condition for second gear operation (note Fig. 6). This is because, if in second gear an inverse drive is applied from shaft 147 to the engine-coupled clutch C-1, the clutch 101 will overrun, producing a free-wheeling instead of a braking effect. In order to avoid this, as shown in Fig. 9, dental coupling 111 is closed. Clutch C-2 is open and clutch C-1 is closed. Overrunning clutch 101 then becomes inoperative or immobilized. It neither overruns nor is responsible for the connection between gears 93 and 105. Thus, as will be seen from Fig. 9, shaft 147 drives through the active planetary train of box D inversely through the fixed-center gear train in box B, the drive being through gears 123, 105, 93, 91 to quill 25 and closed clutch C-1, clutch housing 3 and to the engine. Since the latter is then driven from the road wheels, it acts as a resistance to hold the car under control in descending any hill on which it is desired to use the hill gear.

Reverse gear operation (Fig. 10)

For this drive, the clutch C-1 is opened and the clutch C-2 is closed after gear 133 is moved forward to mesh with gear 135. Dental coupling 129 being then opened, the shafts 31 and 117 have their direct coupling broken. This couples shaft 31 to the fixed gear train in box B through the reverse gearing 133, 135, 139 to gear 93. Dental coupling 111 remains closed. The overrunning clutch 101 remains immobilized, so that the drive proceeds from gear 93 through gears 105 and 123 to shaft 117. Dental coupling 163 is closed by engagement at teeth 171. This in effect locks the sun gear 155 with the carrier 149. There being then no relative motion between the planetary gears 153 and the sun gear, the ring gear 159 will be rotated at the same speed as the sun gear 155. This imparts motion directly to driven shaft 147 from shaft 117, throwing the planetary gear train out of torque-converting action, although it transmits torque. At this time the overrunning clutch 143 becomes immobilized in its action. The result is that the entire planetary train in box D is locked to rotate as a unit and consequently, shafts 117 and 147 rotate together. Since the planetary train is prevented from acting as a torque converter, all of the torque is converted in the fixed-center gear box B. It is to be noted that under these conditions the brake 175 is released. Since the gear cluster 135, 139 acts as a reversing train between shaft 31 and gear 93, the operation of shaft 147 will be in reverse with respect to the rotation of shaft 31.

It will be noted that if it were not for the overrunning clutch 143, a reverse drive could be obtained in first or second gear by meshing gear 133 to 135. But this cannot be done because the reverse acting shaft 117 would then cause it to overrun the shaft 147 in a backward direction and transmit no power to shaft 147 (see Figs. 5 and 6). It is for this reason that the coupling 163 is closed when gears 133 and 135 are connected for reverse (Fig. 10). Closing of this coupling 163 has the effect, as stated, of locking together all of the planetary parts so that the entire planetary system rotates as a whole, the overrunning clutch 143 being locked out of action.

Rocking action

It is often desirable to rock a vehicle when mired or when in heavy snow or the like. Rocking action can readily be brought about simply by alternately energizing and deenergizing clutches C-1 and C-2, referring to the Fig. 10 connections. From this figure it will be seen that such alternate energizing of these clutches applies torque to gear 93 in either forward or reverse direction, thus causing the whole transmission to operate reversibly in response to alternate energizations of clutches C-1 and C-2.

Advantages

A small number of meshing gears is required and these are of the simplest variety, having few moving tooth meshes. No compound planetary action is employed. The train in gear box B is of the fixed-center variety. The train in box D is of the simple planetary variety that has been found in common use to be most trouble-free, particularly in overdrive attachments. Moreover, considering the number of speeds that are available, four speeds forward, hill gear and reverse gear, the transmission is lightweight and economical to build and hence very practical for use in a low cost automobile. The magnetic operation of the clutches C-1 and C-2, and of the planetary gear brake in box C, permits simplified external controls for these three items. Only the dental couplings 111, 129 and 163 require external mechanical control linkages. The operation of the overrunning clutches 101 and 143 is entirely automatic.

For the number of speeds available, the number of items to be controlled is small. For example, to change from first gear to second gear brake 175 is set to throw the planetary train into overdrive. In order to change from third gear to fourth gear this same brake 175 is set again to throw the planetary train into overdrive. Also, to convert from fourth gear cruising conditions on a downgrade to hill drive it is only necessary to close the dental coupling 111.

It is to be understood that while the transmission relies for many of its improved functions upon the combination of the reverted fixed-center gear train in box B and the planetary gear train in box D, some advantages accrue from subcombination of the multiple clutches C-1 and C-2 with the train in the box B. It is also to be understood that advantages exist in the floating laminated ring mountings 79 and 79' between the clutch housing 3 and the magnetic rings 77 and 75, whereby the latter are supported in a floating manner. This simplifies the magnetic clutch construction, since no spline or pin constructions are required to float the magnetic rings.

It should be noted that gears 93 and 105 are in effect coupled as a cluster under first gear, second gear, hill gear and reverse gear operation. The purpose of the overrunning clutch 101 is to eliminate back driving from gear 123 through gears 105, 93 and 91 under third and fourth gear operations when clutch C-1 is open. Under these operations the driven disc 37 of clutch C-1 and parts 17, 91, 93 may rotate indifferently, instead of being rotated at unnecessarily high speeds. The purpose of the coupling 111 is to eliminate the overrunning action of the overrunning clutch 101 during the inverse driving in hill gear and in reverse gear, these being the only times that the automatic actions of this clutch 101 are not desired.

The ability to rock a mired vehicle simply by alternately energizing clutches C-1 and C-2 (under the Fig. 10 arrangement) is of considerable advantage.

Reference to the fixed-center gear train in the box B as being a reverted train means that the action through the train of gears 91, 93, 105 and 123 passes from the shaft 31 through the gears 93 and 105 on the countershaft 97 and reverts back to the countershaft 117, which is coaxial with the shaft 31. The common axis of shafts 31 and 117 is the axis of reversion.

Reference is hereby made under the provisions of Rule 78 to the application of Martin P. Winther, one of the applicants herein and co-assignee of said application and a part of the present application; said application being identified as Serial No. 132,764, filed December 13, 1949, for Magnetic Clutch.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A transmission comprising a first selectively operable clutch having a first driven member carrying a gear, a second selectively operable clutch having a second driven member carrying one element of an operable first direct coupling, both clutches being driven from a common element, a driven intermediate shaft coaxial with said driven members, said driven shaft carrying a gear and a driven element of said first direct coupling; a fixed-center gear train comprising a countershaft supporting a first gear meshing with the gear on said first driven member and a second gear meshing with the gear on said intermediate shaft, an overrunning clutch adapted to connect said last two gears so that the former may drive the latter in a 1:1 ratio or the latter may overrun the former, an openable direct coupling between said last-mentioned gears adapted when closed to immobilize said overrunning clutch; a reverse gear element meshed with said first gear on the countershaft, a gear coordinately movable with said first direct coupling and driven by the driven member of the second clutch adapted to mesh with said reverse gear element when said first openable direct coupling is open; a final driven shaft, a planetary gear train connecting the intermediate driven shaft with the final driven shaft; said planetary gear train consisting of a sun gear, a brake for locking or releasing the sun gear, an openable 1:1 coupling between the sun gear and said intermediate driven shaft, a planet gear meshing with the sun gear, a planetary carrier on the intermediate driven shaft carrying said planet gear, a gear engaged by said planet gear and connected with the final driven shaft, and an overrunning clutch between the intermediate driven shaft and the final driven shaft.

2. A transmission comprising a first selectively operable clutch having a driven quill carrying a gear, a second selectively operable clutch having a driven shaft passing through the quill and carrying one element of an openable first direct coupling, both clutches being driven from a common element, a second and intermediate driven shaft coaxial with said quill, said second driven shaft carrying a gear and a driven element of said openable direct coupling; a fixed-center gear train comprising a countershaft supporting a first gear meshing with the gear on said driven quill and a second gear meshing with the gear on said intermediate shaft, an overrunning clutch adapted to connect said last two gears so that the former may drive the latter in a 1:1 ratio or the latter may overrun the former, an openable direct coupling between said last-mentioned gears adapted when closed to immobilize said overrunning clutch; a reverse gear cluster having one element meshed with said first gear on the countershaft, a gear coordinately movable with said first openable direct coupling and driven by the driven member of the second clutch adapted to mesh with said reverse gear element when said openable direct coupling is open; a final driven shaft, a planetary gear train connecting the intermediate driven shaft with the final driven shaft; said planetary gear train consisting of a sun gear, a brake for locking or releasing the sun gear, an openable 1:1 coupling between the sun gear and said intermediate driven shaft, a planet gear meshed with the sun gear, a planetary carrier on the intermediate driven shaft carrying said planet gear, a ring gear engaged by said planet gear and connected with the final driven shaft, and an overrunning clutch between the intermediate driven shaft and the final driven shaft.

MARTIN P. WINTHER.
HOWARD J. FINDLEY.

REFERENCES CITED

The following references are of record in the file of this patent:

UNITED STATES PATENTS

| Number | Name | Date |
|---|---|---|
| 1,759,558 | Jacobs | May 20, 1930 |
| 1,823,334 | Payne | Sept. 15, 1931 |
| 1,981,807 | Lyman | Nov. 20, 1934 |
| 2,070,813 | Stearn et al. | Feb. 16, 1937 |
| 2,086,600 | Burtnett | July 13, 1937 |
| 2,185,538 | Burtnett | Jan. 2, 1940 |
| 2,314,554 | Pennington | Mar. 23, 1943 |
| 2,355,709 | Dodge | Aug. 15, 1944 |
| 2,485,688 | Banker | Oct. 25, 1949 |
| 2,534,134 | Kirkpatrick | Dec. 12, 1950 |

FOREIGN PATENTS

| Number | Country | Date |
|---|---|---|
| 460,770 | Great Britain | Jan. 29, 1937 |